United States Patent
Altelaar et al.

(10) Patent No.: US 6,767,095 B1
(45) Date of Patent: Jul. 27, 2004

(54) SHIELDING MEMBER FOR EYE PROTECTION AGAINST SUN RAYS

(75) Inventors: Ferry Jacob Altelaar, Weesp (NL); Antoinette De Groot, Weesp (NL)

(73) Assignee: Visionary Solutions 21st Century B.V. (NL)

( * ) Notice: Subject to any disclaimer, the term of this patent is extended or adjusted under 35 U.S.C. 154(b) by 0 days.

(21) Appl. No.: 10/048,255

(22) PCT Filed: Jul. 27, 2000

(86) PCT No.: PCT/NL00/00535
§ 371 (c)(1),
(2), (4) Date: Jun. 13, 2002

(87) PCT Pub. No.: WO01/09667
PCT Pub. Date: Feb. 8, 2001

(30) Foreign Application Priority Data

Jul. 29, 1999 (NL) .............................. 1012737

(51) Int. Cl.[7] .............................................. G02C 9/00
(52) U.S. Cl. .............................. 351/59; 351/44; 351/47; 351/57
(58) Field of Search ............................. 351/47, 48, 57, 351/58, 41, 44, 158, 92, 86, 155, 59; 2/10, 12, 435

(56) References Cited

U.S. PATENT DOCUMENTS

| 2,235,599 | A | | 3/1941 | Woodard | 2/12 |
| 5,005,214 | A | | 4/1991 | Koethe | 2/13 |
| 5,321,443 | A | | 6/1994 | Huber et al. | 351/47 |
| 5,379,464 | A | | 1/1995 | Schleger et al. | 2/431 |
| D385,573 | S | * | 10/1997 | Ertz | D16/300 |
| 5,712,697 | A | | 1/1998 | Walton | 351/47 |
| 5,729,321 | A | | 3/1998 | Wielhouwer | 351/44 |
| 5,815,235 | A | * | 9/1998 | Runckel | 351/92 |
| 6,089,705 | A | * | 7/2000 | Ertz | 351/44 |

FOREIGN PATENT DOCUMENTS

| DE | 3909131 | 12/1989 |
| FR | 1012737 | 3/1961 |
| JP | 11036127 | 2/1999 |

* cited by examiner

*Primary Examiner*—Hung Xuan Dang
(74) *Attorney, Agent, or Firm*—Webb Ziesenheim Logsdon Orkin & Hanson, P.C.

(57) ABSTRACT

The invention relates to a device for protecting eyes against the rays of the sun, comprising: a support frame mountable on a head and at least one shielding member displaceable relative to the support frame. The shielding member can herein preferably be fixed in a plurality of positions relative to the support frame, for instance in that it is pivotally mounted on the support frame.

11 Claims, 1 Drawing Sheet

SHIELDING MEMBER FOR EYE PROTECTION AGAINST SUN RAYS

BACKGROUND OF THE INVENTION

1. Field of the Invention

The invention relates to a device for protecting eyes against the rays of the sun, comprising: a support frame mountable on a head provided with an ear support, and at least one shielding member displaceable relative to the support frame, wherein the shielding member has a curved shape which fits the shape of the face of a user, and wherein the shielding member is connected to the support frame for pivoting round at least one point of rotation.

2. Description of the Prior Art

The advantages of protecting eyes against the sun's rays, such as for instance preventing glare, are generally known. Use is made for this purpose inter alia of sunglasses, which filter out in optionally selective manner a part of the sun's rays. Drawbacks to the use of sunglasses are that a part of the light from the image the wearer of sunglasses wants to look at is also filtered out. In addition, it may be irritating that the eyes of the wearer of the sunglasses cannot be seen, for instance when a conversation is taking place. Another method of protecting eyes against the rays of the sun is the use of a cap or sun visor which is placed on the head. Not only the eyes but also a part of the face surrounding the eyes of the wearer is hereby shielded against direct rays of the sun. It is also uncomfortable, particularly in warm conditions, to wear a cap or sun visor.

The American patent U.S. Pat. No. 5,379,464 discloses a facial shield for protection of the eyes from the sun. The shield comprises a one piece shielding member and supporting means coupled to the shielding member for supporting the shielding member on a user's head. The shielding member has a curved shape which fits the shape of the face of a user, wherein the shielding member is connected to the supporting means for pivoting round at least one point of rotation. The shielding also comprises a nose support which is an integrated part of the shielding member. The facial shield as described in this publication has the drawback that displacement of the shielding member relative to the supporting means can solely occur in a considerable restrictive way. The position of the shielding member relative to the eyes is fixed, which can result in situations wherein the eyes are not optimally protected against the rays of the sun.

The present invention has for its object to provide a device of the type stated in the preamble, with which eyes can be totally protected against the rays of the sun without the above stated drawbacks of sunglasses, cap, sunshield and sunglasses with sunshield.

The invention provides for this purpose a device of the type stated in the preamble, characterized in that the support frame comprises at least one nose support and wherein the shielding member is connected to the support frame in such a way that tile point of rotation is situated between the nose support and the ear support. Using this device the eyes can be shielded from the rays of the sun very selectively and completely without a greater part of the face simultaneously being shielded from the rays of the sun. A particular advantage is here found to be that the shade created on the eyes (and the eyelids) provides a strong sensation of cooling. An underlying reason for this could be that the eyes and eyelids are relatively sensitive body parts, the local temperature sensation of which has a considerable influence on the general temperature sensation. In addition, it can be an advantage that the selective shielding of the eyes contributes toward even tanning of the face. Yet another advantage is that the eyes of a user of the device according to the invention generally remain visible to conversation partners and that the light from objects being viewed by the user is not filtered, so that a relatively strong image can be observed. The curved shape of the shielding member fitting the face of a user has the advantage that the distance between the face of the wearer and the shielding member is more or less constant over the whole length of the shielding member, irrespective of the position of the shielding member. This results in an improved shielding action of the device according to the invention. An example of this improved shielding action is the intercepting of sun's rays which are laterally incident on the face of a user of the device; the curved shape of the shielding member also intercepts these rays before they are incident on an eye of the user of the device. The device according to the invention forms a universal solution which combines the advantages of the already existing (sun)light shielding means and which in addition also provides extra functionality. The nose support leads to a comfortable wearing of the device. As the nose support is a part of the support frame, the position of the support frame relative to the eyes is, during use, more or less fixed, while the shielding member has a high degree of freedom of rotation round the support frame. An advantage of the adjustment of the shielding member in a broad range is that the position of the shielding member is always or often adjustable in such a way that the eyes are protected in an optimal way against the rays of the sun.

The American patent publication U.S. Pat. No. 2,235,599 discloses an adjustable eye-shield, which comprises a transparant, resilient eye-shield panel of a substantially rectangular shape, and a flexible head-band connected thereto. The eye-shield is adapted to protect the eyes of a wearer from the glare of artificial light and may serve as a protection for flying particles of matter.

A removable sunglass assembly for attachment to a conventional eyeglass assembly is disclosed by the American patent publication U.S. Pat. No. 5,321,443. When the sunglass assembly is attached to the eyeglass assembly, the position of the sunglass assembly relative to the eyeglass assembly is more or less fixed. In een preferred embidoment the shielding has a curved shape which fits the shape of the face of a user.

Known from the American patent U.S. Pat. No. 5,729,321 is a combination of sunglasses and a sunshield with a tinted panel and an opaque panel. Both panels are substantially rectangular and rotatably connected to a horizontal headband. The headband is manufactured from resilient plastic and forms part of a support structure which more or less corresponds with an eyeglass frame. The opaque panel is suitable for partial or complete shielding of the eyes of the user against intense sunlight.

In the American patent U.S. Pat. No. 5,005,214 a shade visor removable from a pair of glasses is provided with resilient loops for engaging on an eyeglass frame. The shade visor is designed to be attached above the lenses in a stationary position. Such a shade visor differs very considerably from the device according to the invention, for instance because of the lack of the adjustability of the sun shade relative to the eyeglass frame.

In one preferred embodiment the point of rotation is situated, in a side view, on the side of the nose support directed toward the ear support. The point of rotation forms a structurally simple and adjustable coupling between shielding member and support frame. By placing the point of rotation at a position which, in front view of the device, lies behind the nose support, the shielding member becomes displaceable such that it can also be rotated to positions above or below the nose support. The very significant advantage of this high degree of adjustability resulting from the location of the point of rotation is that light rays coming from below or above can also be shielded. The device can thus shield the eye from the sun's rays or reflection from a wet road surface or a water surface. The device can also be used to shield the eyes of a person who is lying in the sun and wherein the sunlight is incident from a position close to the side where the temple bar members are situated. Conversely, light rays incident more or less parallel to the forehead can also be intercepted. Owing to the point of rotation situated to the rear, the shielding member can be rotated to a position above the supporting structure, close to the eyes, and in an extreme case even so far that the shielding member lies against the forehead. Another advantage is that the device can be employed such that a user can look over the shielding member or under the shielding member. Another advantage of the device according to the invention is that it can be manufactured in aesthetically very responsible manner such that it can even be worn as a fashion accessory.

For a more solid construction of the device it is recommended that the shielding member is pivotally connected to the support frame by means of two points of rotation, which points of rotation are located on either side of the nose support.

In another preferred embodiment the shielding member can be fixed in a plurality of positions relative to the support frame, for instance in that the shielding member is mounted pivotally on the support frame. The shielding member can thus be placed in a fixed position such that it situated between the sun (or other inconvenient radiation source) and the eyes.

In yet another preferred embodiment the shielding member consists substantially of an elongate and curved strip of shielding material, for instance manufactured from a material which is impermeable for the rays of the sun. This impermeability can for instance be obtained in that a part of the shielding member is at least provided with a metal layer. It is of course also possible to manufacture the shielding member wholly from metal. Alternatively, it is likewise possible for the shielding member to be provided with a material which is partly permeable for the rays of the sun. A part of or the whole shielding member can thus be partly permeable for the sun's rays (for instance filtering out infrared and ultraviolet but not the visible part of the spectrum).

For a further limitation of the radiation on the eyes and eyelids, the side of the shielding member directed toward the support frame is provided in a preferred embodiment with a surface absorbing the rays of the sun. Reflecting radiation will hereby also be at least partly intercepted. In practice the absorbing surface will be embodied in matt black.

For embellishment purposes the shielding member can be provided with a decorated surface on the side remote from the support frame. Such a surface can also function extremely well as advertising surface.

Finally, a variant of the invention can also be envisaged wherein the support frame is formed by a pair of glasses. Known corrective glasses and/or known sunglasses can thus be equipped with a shielding member, whereby a new support frame is unnecessary. The pair of glasses will then function as support frame.

BRIEF DESCRIPTION OF THE DRAWINGS

The invention will be further elucidated with reference to the non-limitative embodiment shown in the following figure. Herein.

DETAILED DESCRIPTION OF THE PREFERRED EMBODIMENTS

Figure 1:
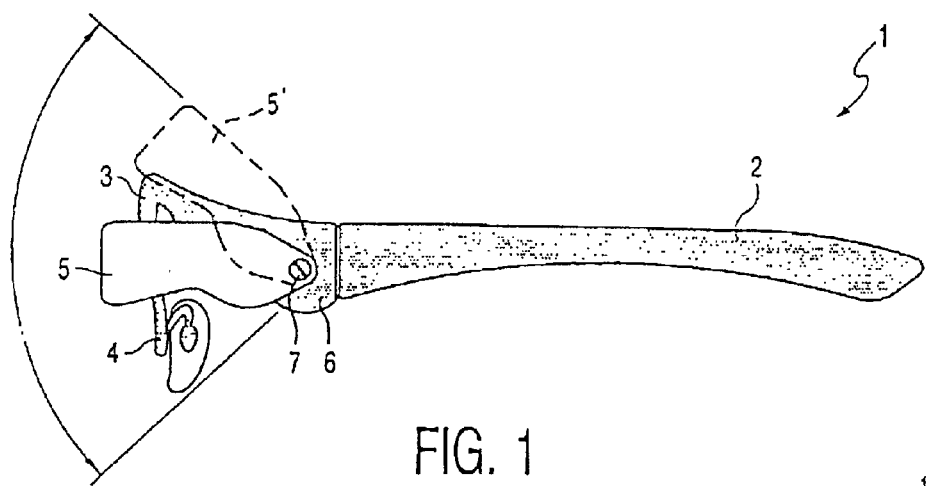
FIG. 1 shows a side view of an embodiment of the device according to the invention.

FIG. 1 shows device 1 in side view with a temple bar member 2 which is formed to engage on the ear of a wearer. Temple bar member 2 transposes into a bridge part 3 which is intended for placing above the eyes of the user at the height of the eyebrows. Engaging on bridge part 3 is a nose support 4 which is clearly visible in the following FIG. 2. A shielding member 5 is pivotally connected to a transition 6 from temple bar member 2 to bridge part 3. This transition 6 is formed in this case such that a screw 7 can engage thereon. By means of screw 7 the shielding member 5 is connected rotatably to transition 6.

In the shown situation the shielding member 5 is placed in a horizontal position. Depending on the position in which the user of device 1 is situated and the position of the inconvenient radiation source, shielding member 5 can be rotated relative to transition 6, for instance to a position such as shown by means of broken shielding member 5'. Auxiliary lines indicate the range within which shielding member 5 can for instance be rotated. Shielding member 5 can thus also be rotated into a position close to the lower end of the adjustment range indicated with auxiliary lines. Without loss of functionality the shielding member 5 can take such a narrow form (for instance with a width of 12 millimeters) that a good air circulation remains possible between the face of a user and shielding member 5.

Figure 2:
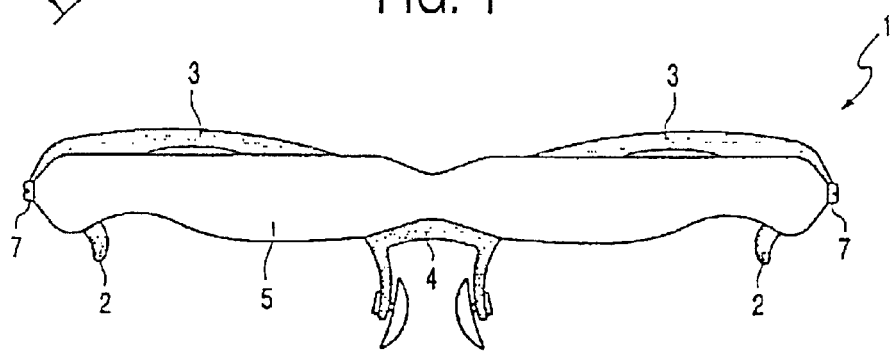
FIG. 2 shows a front view of the device shown in FIG. 1.

FIG. 2 shows device 1 in front view, wherein it is clearly visible that nose support 4 is placed in the middle of bridge part 3. Also clearly visible is that shielding member 5 can be embodied as a substantially elongate strip in which, for a good fit with the face, recesses can be arranged in extreme positions, such as for instance shown at the position of nose support 4.

Figure 3:
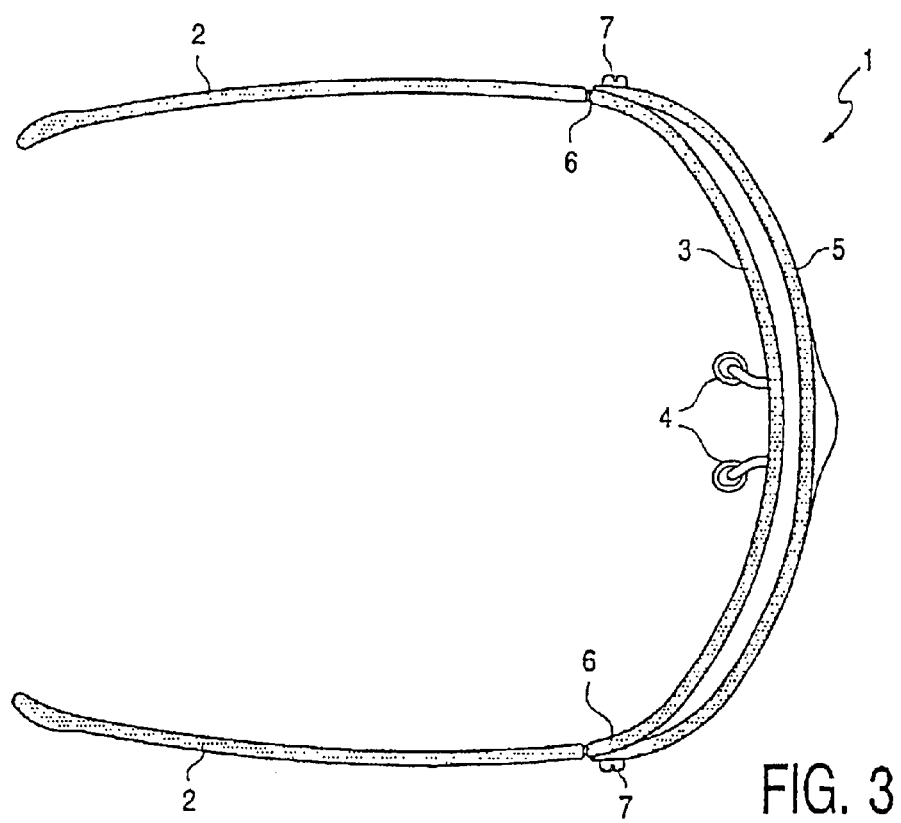
FIG. 3 shows a top view of the device shown in FIG. 1.

FIG. 3 finally shows device 1 in top view, wherein the curved shape of shielding member 5 is clearly shown. Also shown is that screws 7, which form the points of rotation of shielding member 5 relative to bridge part 3, are situated to the rear relative to nose support 4.

Although the invention is elucidated with reference to only a single embodiment, it will be apparent to all that the invention is by no means limited to the described and shown embodiment. On the contrary, many variations are possible for a skilled person within the scope of the invention. It is thus for instance conceivable, instead of a single shielding member 5, for a plurality of shielding members to be assembled with bridge part 3, for instance an individual shielding member for each eye. It is also possible to embody the shielding member such that the width of the strip is adjustable. The distance between shielding member 5 and bridge part 3 is also variable; in practice a distance of 5 millimeters is found to be very favourable here. Although the device is described for the purpose of protecting the eyes against the rays of the sun, the device can likewise be applied for protection against other sources of radiation, such as for instance sunbeds. Already stated above is that device 1 can be an excellent medium for carrying advertising messages, but other decorations can also be envisaged such as LEDs and so on.

What is claimed is:

1. A device for protecting eyes against the rays of the sun, comprising:

a support frame mountable on a head and provided with an ear support, and at least one shielding member displaceable relative to the support frame, wherein the shielding member has a curved shape which fits the shape of the face of a user, wherein the shielding member is connected to the support frame for pivoting round at least one point of rotation, wherein the support frame comprises at least one nose support and wherein the shielding member is connected to the support frame in such a way that the point of rotation is situated between the nose support and the ear support and the shielding member is rotatable below a line of sight and relative to the nose support.

2. The device as claimed in claim 1, wherein the point of rotation is situated, in a side view, on the side of the nose support directed toward the ear support.

3. The device as claimed in claim 1, wherein the shielding member is pivotally connected to the support frame by means of two points of rotation, which points of rotation are located on either side of the nose support.

4. The device as claimed in claim 1, wherein the shielding member can be fixed in a plurality of positions relative to the support frame.

5. The device as claimed in claim 1, wherein the shielding member consists substantially of an elongate and curved strip of shielding material.

6. The device as claimed in claim 1, wherein the shielding member is substantially impermeable for the rays of the sun.

7. The device as claimed in claim 1, wherein the shielding member is at least provided with a metal layer.

8. The device as claimed in claim 1, wherein the shielding member is also provided with a material which is partly permeable for the rays of the sun.

9. The device as claimed in claim 1, wherein the side of the shielding member directed toward the support frame is provided with a surface absorbing the rays of the sun.

10. The device as claimed in claim 1, wherein the side of the shielding member remote from the support frame is provided with a decorated surface.

11. The device as claimed in claim 1, wherein the support frame is formed by a pair of glasses.

* * * * *